US012667509B1

(12) United States Patent

Kim

(10) Patent No.: US 12,667,509 B1

(45) Date of Patent: Jun. 30, 2026

(54) UTILITY CART WITH INTEGRATED CONVENIENCE FEATURES

(71) Applicant: Edward Byungsun Kim, Skokie, IL (US)

(72) Inventor: Edward Byungsun Kim, Skokie, IL (US)

( * ) Notice: Subject to any disclaimer, the term of this patent is extended or adjusted under 35 U.S.C. 154(b) by 0 days.

(21) Appl. No.: 19/288,534

(22) Filed: Aug. 1, 2025

(51) Int. Cl.
  *A61G 12/00* (2006.01)
  *A61G 9/00* (2006.01)
  *B62B 3/00* (2006.01)

(52) U.S. Cl.
  CPC ........... *A61G 12/001* (2013.01); *A61G 9/006* (2013.01); *B62B 3/005* (2013.01); *B62B 2301/04* (2013.01)

(58) Field of Classification Search
  None
  See application file for complete search history.

(56) References Cited

U.S. PATENT DOCUMENTS

| | | | | | |
|---|---|---|---|---|---|
| 5,014,371 | A | * | 5/1991 | Heel | A45D 19/04 4/518 |
| 6,857,137 | B2 | * | 2/2005 | Otto | A61G 9/00 4/144.1 |
| 9,596,966 | B1 | * | 3/2017 | Taylor | A47K 17/00 |
| 2008/0012257 | A1 | * | 1/2008 | Cregg | B62B 3/12 280/47.35 |
| 2022/0241125 | A1 | * | 8/2022 | Easley | A61G 12/001 |
| 2022/0280710 | A1 | * | 9/2022 | Agrawal | A61M 1/62 |

FOREIGN PATENT DOCUMENTS

| | | | | |
|---|---|---|---|---|
| CN | 204181838 | U | * | 3/2015 |
| CN | 104856826 | A | * | 8/2015 |
| CN | 106955208 | A | * | 7/2017 | A61G 9/006 |
| CN | 206508166 | U | * | 9/2017 |
| CN | 107854255 | A | * | 3/2018 | A61G 9/006 |
| CN | 108556882 | A | * | 9/2018 | B62B 5/06 |
| CN | 110464570 | A | * | 11/2019 | A61G 9/02 |
| CN | 111284546 | A | * | 6/2020 | B62B 5/00 |
| CN | 111616883 | A | * | 9/2020 | A61H 35/00 |
| CN | 213722788 | U | * | 7/2021 |
| CN | 113384416 | A | * | 9/2021 | A61G 9/003 |

(Continued)

OTHER PUBLICATIONS

Translation of CN-104856826-A (Year: 2015).*
Translation of CN-107854255-A (Year: 2018).*
Translation of ES-1075934-U (Year: 2012).*

*Primary Examiner* — Katy M Ebner

(74) *Attorney, Agent, or Firm* — KORUS Patent, LLC; Seong Il Jeong

(57) ABSTRACT

A mobile utility cart configured for bedside use by elderly or mobility-impaired individuals. The cart incorporates a mobile frame mounted on caster wheels and features an integrated urinal system, which includes a urinal inlet, a detachable urine container, and a connecting tube. The cart further provides multi-tier storage drawers for personal and hygiene items, an LED lighting system for nighttime illumination, a USB charging port for electronic devices, and an integrated waste disposal bin. This integrated design facilitates bedside toileting and care, organizes essential items, provides light, enables device charging, and manages waste, thereby reducing user movement and supporting enhanced safety and hygiene during nighttime use.

12 Claims, 2 Drawing Sheets

(56)            References Cited

FOREIGN PATENT DOCUMENTS

| CN | 214342413 | U  | * | 10/2021 | | |
| CN | 115154117 | A  | * | 10/2022 | ............... | A61G 9/00 |
| CN | 115192346 | A  | * | 10/2022 | ............... | A61G 9/00 |
| CN | 219323626 | U  | * | 7/2023 | | |
| CN | 219614270 | U  | * | 9/2023 | | |
| ES | 1075934 | U  | * | 1/2012 | | |
| KR | 102629018 | B1 | * | 1/2024 | ............... | A61G 9/00 |

* cited by examiner

UTILITY CART WITH INTEGRATED CONVENIENCE FEATURES

BACKGROUND

Field of the Invention

The present invention relates to a utility cart designed for personal care and assistance, and more particularly to a mobile, bedside utility cart equipped with a comprehensive suite of integrated features. These features include a discreet urinal system, multi-tier storage drawers, adjustable lighting, convenient charging ports, and hygienic waste disposal capabilities. The invention is specifically conceived and designed to provide enhanced support, safety, and independence for elderly individuals, mobility-impaired persons, post-operative patients, and others with restricted mobility, particularly during nighttime hours.

Description of Related Art

Elderly individuals and persons experiencing limited mobility, whether due to age, injury, or medical conditions, frequently encounter challenges during nighttime hours. A common issue is nocturia, the need for frequent urination during the night. Each trip from the bed to the restroom, especially when performed in low-light conditions or while disoriented from sleep, significantly elevates the risk of falls. Such falls can lead to serious injuries, including fractures, head trauma, and other complications, which often result in a further decline in mobility, increased dependence on caregivers, and a substantial reduction in overall quality of life and independence.

Existing solutions for bedside convenience and care often fall short in addressing these multifaceted needs comprehensively. Traditional nightstands offer static surfaces for personal items but lack any integrated toileting or waste management solutions. Simple rolling carts may provide some storage and mobility, but they typically do not incorporate essential functionalities such as a discreet urinal system, dedicated compartments for hygiene items, or integrated power sources for personal electronic devices. Similarly, standalone commodes or portable urinals address the toileting need but are often bulky, difficult to maneuver, lack integrated storage, and do not contribute to overall bedside safety or convenience through lighting or charging capabilities. These disparate devices require multiple movements between different points in the room, thus failing to sufficiently reduce the risk of falls or streamline nighttime care routines.

Consequently, there remains a significant and unmet need in the field of personal care for a compact, highly portable, and intelligently designed utility cart. Such a device must seamlessly integrate essential nighttime features-including accessible toileting, organized storage for hygiene and medical items, soft and non-disruptive illumination, and convenient charging-into a single, cohesive unit. The objective is to proactively mitigate fall risks by minimizing unnecessary nighttime movement, improve personal hygiene through immediate waste management, and enhance overall safety and convenience for vulnerable users.

SUMMARY OF THE INVENTION

The present invention addresses the aforementioned unmet needs by providing a novel, multifunctional utility cart. This cart is specifically engineered to significantly enhance nighttime care, safety, and convenience for elderly or mobility-impaired individuals by integrating a range of essential features into a single, cohesive, and mobile unit.

In a primary aspect, the invention provides a bedside utility cart that integrates:

A readily accessible urinal system: This system allows users to urinate directly at bedside, significantly reducing the need to rise from bed and mitigating the associated risk of falls. The system is designed for ease of use and hygienic operation.

Multi-tier storage compartments: These compartments are strategically configured to provide organized and accessible storage for a variety of essential hygiene products, medical supplies, personal care items, and other necessities, keeping them within arm's reach.

Soft-glow LED lighting: An integrated lighting system provides gentle, ambient illumination. This soft light enhances visibility within the immediate bedside area without producing harsh glares that could disrupt the user's sleep cycle or that of a caregiver. The lighting may optionally be motion-activated to further conserve energy and minimize sleep disturbance.

A USB charging port: An integrated universal serial bus (USB) charging port is provided for convenient powering and recharging of mobile electronic devices, such as smartphones, tablets, or various medical monitoring devices (e.g., glucose meters, Continuous Positive Airway Pressure (CPAP) machines), ensuring continuous device access and functionality.

A sanitary waste disposal compartment: A dedicated and discreet waste disposal bin is built directly into the cart's frame, facilitating the immediate and hygienic disposal of used wipes, tissues, absorbent products, or other disposables, thereby promoting a cleaner and more sanitary environment.

The overall design of the utility cart prioritizes mobility, optimal hygiene management, and paramount user safety. Its integrated, all-in-one approach significantly reduces the necessity for nighttime movement, thereby directly addressing and mitigating the primary risk of falls, particularly for elderly individuals, post-operative patients, or others with restricted mobility. The invention aims to support greater independence, enhance dignity in personal care routines, and provide peace of mind for both users and their caregivers.

BRIEF DESCRIPTION OF THE DRAWINGS

The accompanying drawings, which are incorporated in and constitute a part of this specification, illustrate embodiments of the present invention and, together with the general description given above and the detailed description of the embodiments given below, serve to explain the principles of the present invention.

DETAILED DESCRIPTION OF THE INVENTION

Figure 1:
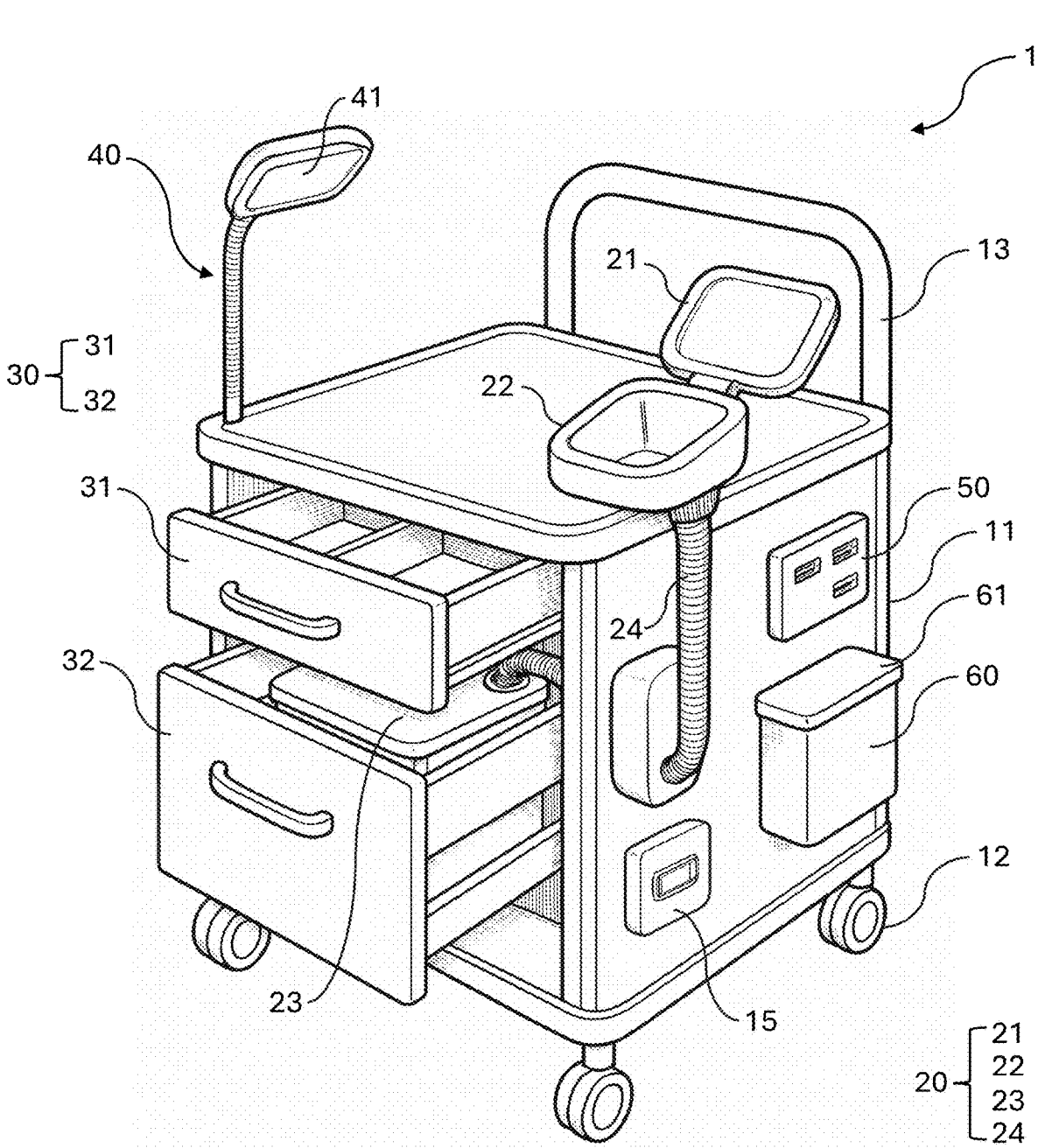
FIG. 1 is a perspective view of an exemplary embodiment of the utility cart, clearly illustrating its main exterior components and their spatial relationships.
Figure 2:
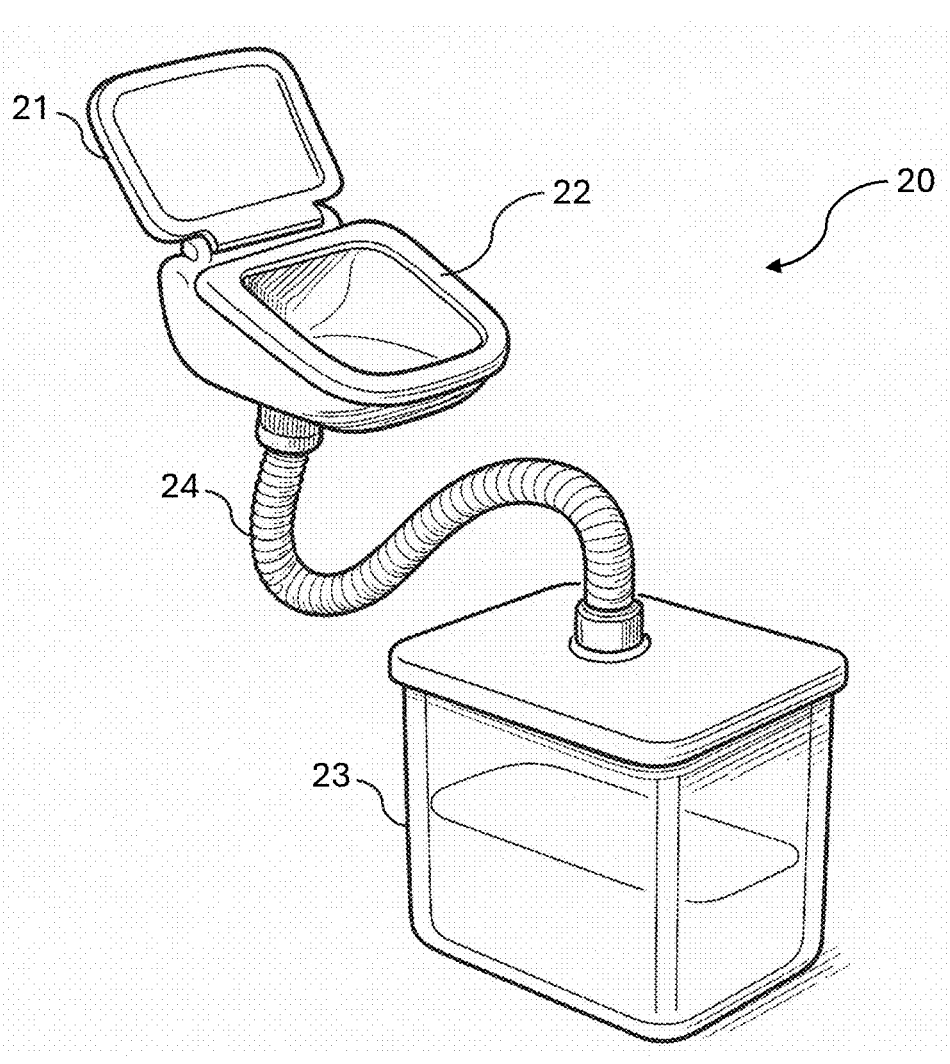
FIG. 2 is an enlarged view of the integrated urinal system, providing a detailed illustration of its components, connection points, and functional arrangement.

The present invention provides a novel utility cart designed to enhance personal care, safety, and convenience, particularly for elderly or mobility-impaired individuals during nighttime hours. Referring now to FIGS. 1-2, a detailed description of the various components and their integrated functionalities is provided.

The utility cart 1 generally comprises a mobile frame 11 that serves as the foundational structure, supporting and integrating all functional components. FIG. 1 is a perspective view of an exemplary embodiment of the utility cart, clearly illustrating its main exterior components and their spatial relationships.

1. Frame and Mobility

Frame 11: The frame 11 forms the structural backbone of the utility cart 1. It is preferably constructed from lightweight, yet highly durable materials such as aluminum tubing, high-strength plastics (e.g., ABS, polypropylene), or a combination thereof. The design of the frame 11 is optimized for stability, preventing tipping during user interaction or maneuvering. In one embodiment, the frame 11 may be modular, allowing for easy assembly, disassembly, or replacement of parts. The dimensions of the frame 11 are compact, typically ranging from 20-30 inches in height, 15-20 inches in width, and 18-24 inches in depth, to ensure it fits comfortably beside a standard bed without obstructing pathways.

Caster Wheels 12: The frame 11 is mounted on a plurality of caster wheels 12, typically four, for effortless maneuverability across various floor surfaces (e.g., carpet, hardwood, tile). Each caster wheel 12 is preferably a swivel caster to allow for 360-degree rotation, enhancing the cart's ability to navigate tight spaces. In a preferred embodiment, at least two of the caster wheels 12, and more preferably all four, are equipped with lockable mechanisms. These locking mechanisms, which can be foot-activated levers, ensure that the cart 1 remains securely in place during use, preventing unintended movement and further enhancing user safety.

Handle 13: A handle 13 is ergonomically attached to the frame 11, typically at an accessible height (e.g., 30-36 inches from the floor). The handle 13 facilitates easy pushing, pulling, and guiding of the cart 1 by either the user or a caregiver. The handle 13 may be fixed or, in an alternative embodiment, adjustable in height or foldable to optimize storage or user comfort. It may also feature a non-slip grip material for enhanced control.

A power cable is integrated into the cart 1 for supplying electrical power to its internal systems, specifically the LED lighting system 40 and the USB charging port 50. The power cable is typically a standard alternating current (AC) power cord designed to plug into a wall outlet. For safety, the power cable should be durable, adequately insulated, and potentially feature a retractable mechanism or integrated cord management system to prevent tripping hazards. In an alternative embodiment, the cart 1 may also include an integrated rechargeable battery 15 to allow for cordless operation for a limited duration, enhancing mobility without continuous reliance on a wall outlet. This battery could be charged via the power cable.

2. Integrated Urinal System

The integrated urinal system 20 is an important component of the invention, designed to provide discreet and convenient bedside toileting, thereby minimizing the need for the user to leave the bed. FIG. 2 is an enlarged view of the integrated urinal system, providing a detailed illustration of its components, connection points, and functional arrangement.

Urinal Inlet 22 with a Lid 21: The urinal inlet 22 serves as the receptacle for urine. It is externally mounted to the frame 11, typically on a side or front panel, at an adjustable height. The adjustable height feature allows the urinal inlet 22 to be positioned optimally for users of varying bed heights or sitting positions, ensuring comfortable and easy access without requiring the user to significantly shift their body. The urinal inlet 22 is ergonomically shaped to facilitate use by individuals with limited dexterity and to minimize splashing. A lid 21 is pivotally or removably attached to the urinal inlet 22. The lid 21 is designed to provide a tight seal, minimizing odors and maintaining hygiene when the system is not in use. It may feature a soft-close mechanism to prevent noise. The urinal inlet 22 itself is preferably constructed from an easy-to-clean, non-porous material such as medical-grade plastic (e.g., polypropylene) or treated stainless steel, resistant to urine and common cleaning agents.

Urine Container 23: The urine container 23 is securely housed within a lower, designated compartment of the cart's frame 11, specifically designed to hold it discreetly. The container 23 is engineered to be detachable for easy removal, emptying, and thorough cleaning, promoting superior hygiene. It typically has a volume capacity suitable for multiple uses (e.g., 1-2 liters) and features a leak-proof design to prevent spills during transport or handling. The container 23 may also incorporate a visual indicator for fluid level.

Tube 24: A flexible and durable tube 24 fluidly connects the urinal inlet 22 to the urine container 23. The tube 24 is designed for efficient and hygienic flow of urine from the inlet 22 to the container 23, preventing backflow or leakage. The length of the tube 24 is optimized to accommodate the adjustable height of the urinal inlet 22 without kinking. The tube 24 is also preferably made from medical-grade, non-kinking, and easy-to-clean materials that are resistant to urine and odors. The connection points between the tube 24 and both the urinal inlet 22 and the urine container 23 are designed for secure, leak-proof attachment and easy detachment for cleaning.

3. Drawer System

The drawer system 30 provides organized and easily accessible storage for essential personal care items. The drawer system 30 comprises an upper drawer 31 and a lower drawer. Both drawers 31, 32 are preferably constructed from durable, easy-to-clean plastic or coated metal.

Upper Drawer 31: The upper drawer 31 is positioned at an ergonomic height for easy reach from a seated or semi-reclined position. This drawer 31 is typically segmented into multiple compartments (as shown in FIG. 1) of varying sizes. These compartments are ideally configured for organizing small hygiene items such as pre-moistened wipes, adult diapers or absorbent pads, medications, small medical devices (e.g., thermometers, blood pressure cuffs), eyeglasses, remote controls, or other personal effects a user might need during the night. The compartments help prevent items from shifting during cart movement and allow for quick visual identification and access. The upper drawer 31 may feature smooth-gliding runners for quiet operation and may optionally include a soft-close mechanism.

Lower Drawer 32: The lower drawer 32 may be divided by a divider and one space divided by the divider is specifically configured and sized to securely accommodate the urine container 23 to hold the detachable urine container 23 when it is disconnected from the tube 24 for transport or storage. This design ensures discreet and sanitary containment of the urine container 23 when not actively in use, further contributing to hygiene and odor control. This drawer 32 may also provide additional storage space for larger items or spare supplies. A through-hole may be formed in the side wall of the lower drawer 32 to facilitate the passage and integration of the urine system's tube 24.

4. LED Lighting System

The LED lighting system 40 is integrated to enhance visibility without disturbing the user's sleep cycle.

Soft-Glow LED Light 41: A soft-glow LED light 41 is strategically mounted on the cart 1, typically on the top surface or along the frame, to provide ambient illumination. The light emitted is preferably a warm, low-intensity light (e.g., warm white, amber) that is sufficient to illuminate the immediate bedside area and the cart's contents without being overly bright or stimulating, thus preserving the user's sleep environment. The LED technology ensures low power consumption and long lifespan. In a preferred embodiment, the LED light 41 may be motion-activated. This means the light automatically turns on when motion is detected nearby (e.g., the user reaching for the cart or moving in bed) and turns off after a short period of inactivity, further minimizing sleep disruption and conserving power. The motion sensor may be adjustable for sensitivity. Alternatively, or in addition, the light may have a simple on/off switch or adjustable brightness settings.

5. USB Charging Port

Integrated USB Port 50: An integrated USB port 50 is provided on the cart 1, typically on a side panel or the top surface, for convenient charging of various electronic devices. This allows users to keep essential devices such as mobile phones, tablets, e-readers, hearing aids, smartwatches, or even certain medical monitoring equipment powered and within easy reach, eliminating the need for separate wall chargers or power strips. The USB port 50 is connected to the cart's internal power supply (via power cable or internal battery). It may include multiple USB-A or USB-C ports to accommodate different devices.

6. Waste Disposal Bin

Waste Disposal Bin 60: A dedicated waste disposal bin 60 may be hygienically built directly into a side panel of the frame 11 of the cart 1. This bin is designed for the convenient and immediate disposal of used wipes, tissues, cotton swabs, and other disposable personal care items. The bin 60 is typically accessible via a hinged lid 61 or an open slot, designed to contain odors and minimize visual exposure of waste. It preferably accommodates standard small trash bags for easy removal and disposal. The interior of the bin 60 is constructed from a smooth, non-porous material for easy cleaning and disinfection. Its integration promotes immediate cleanup, enhancing overall bedside hygiene.

Operation

In typical operation, the utility cart 1 is positioned adjacent to a user's bed, optimally within easy reach. This strategic placement enables convenient and immediate access to its integrated features during nighttime hours, or whenever the user experiences limited mobility.

When the user needs to urinate, the integrated urinal system 20 allows them to do so directly into the cart 1 without the significant effort or risk associated with rising from bed and navigating to a separate restroom. The adjustable height of the urinal inlet 22 can be tailored to the user's specific needs, ensuring comfort and ease of use. The hygienic design, including the sealed lid 21 and efficient tube 24 connection to the urine container 23, minimizes odors and maintains cleanliness. After use, the urine container 23 can be easily detached, discretely stored in the lower drawer 32, and later removed by the user or a caregiver for emptying and thorough cleaning.

Users can also readily access hygiene and medical items organized within the multi-tier drawer system 30. The upper drawer 31, with its segmented compartments, ensures that items like pre-moistened wipes, medications, or absorbent products are neatly organized, easily located, and retrieved without fumbling in the dark. The lower drawer 32 provides discreet storage for the urine container 23 or other larger supplies.

The integrated LED lighting system 40 provides a soft, ambient illumination that is sufficient to aid visibility within the bedside area, allowing the user to safely interact with the cart's components or navigate nearby objects without having to turn on bright room lights. The optional motion-activation feature ensures that the light automatically turns on only when needed, effectively preserving the user's sleep environment and minimizing disturbances.

Furthermore, the integrated USB charging port 50 enables users to power or recharge essential electronic devices, such as mobile phones, hearing aids, or medical monitoring equipment, conveniently at their bedside. This ensures continuous device access and functionality without requiring the user to leave the bed to find a power outlet.

Finally, waste materials, such as used tissues or wipes, can be hygienically and immediately discarded into the onboard waste disposal bin 60. This all occurs while the user remains safely in bed or comfortably seated nearby. This integrated system for safe, hygienic, and convenient nighttime care significantly reduces the physical demands on the user and potential risks, thereby fostering greater independence and peace of mind.

Advantages

The multifunctional utility cart of the present invention offers a myriad of advantages that directly address the challenges faced by elderly and mobility-impaired individuals, as well as their caregivers.

Firstly, a paramount advantage is its ability to significantly minimize nighttime movement. By integrating essential personal care and toileting functionalities directly at the bedside, the cart drastically reduces the user's need to rise from bed and navigate to a separate restroom. This directly and effectively mitigates the likelihood of falls, which is a leading cause of injury and declining independence in elderly or mobility-impaired users.

Secondly, the utility cart organizes essential personal care and medical items in an accessible, logical layout. The multi-tier drawer system, particularly the segmented upper drawer, allows for systematic storage of hygiene items, medications, and other necessities. This enhanced organization not only improves efficiency during routine use but also ensures that critical items are always within easy reach, reducing frustration and enabling quick access, especially in low-light conditions.

Thirdly, the inclusion of an integrated bedside urinal system and a dedicated waste disposal bin promotes exceptional hygienic toileting and cleanup. The discreet design, easy-to-clean materials, and immediate waste containment minimize odors, reduce the spread of germs, and maintain a cleaner environment, enhancing the user's dignity and comfort.

Fourthly, the integrated lighting and charging functionalities provide substantial added convenience and support.

The soft-glow LED light offers just enough illumination to aid visibility without disrupting sleep, making nighttime tasks safer and less jarring. The integrated USB charging port ensures that vital electronic devices (e.g., communication devices, medical monitors) remain powered and accessible, eliminating the need for awkward cord management or searching for outlets in the dark.

Lastly, the utility cart's all-in-one, comprehensive design makes it exceptionally suitable for a broad range of users including elderly individuals, post-operative patients, individuals recovering from injuries, or anyone with restricted mobility. By consolidating multiple essential functions into a single, mobile unit, the invention actively supports user independence, preserves dignity in personal care, and provides invaluable peace of mind for both users and their caregivers by offering a safe, convenient, and self-sufficient solution for nighttime care needs.

What is claimed is:

1. A utility cart configured as a bedside personal care station, comprising:

a mobile frame configured for stability and maneuverability, the frame mounted on a plurality of caster wheels;

a handle ergonomically attached to the frame for user or caregiver operation;

an integrated urinal system comprising: a urinal inlet with a lid, the urinal inlet being externally accessible and mounted to the frame at an adjustable height; a urine container; and a flexible tube fluidly connecting the urinal inlet to the urine container, enabling hygienic fluid flow;

a drawer system integrated into the frame, the drawer system including an upper drawer and a lower drawer, wherein the upper drawer comprises multiple compartments configured for organizing hygiene items, the lower drawer is configured and sized to house the urine container during both active use and during storage, and the lower drawer includes a side-wall pass-through aperture through which the tube extends from the urinal inlet to the urine container, the urine container being detachably connected to the tube within the lower drawer to permit removal of the urine container by pulling out the lower drawer without rerouting the tube from the urinal inlet;

an LED light mounted to the frame, configured to provide soft-glow ambient illumination for nighttime bedside visibility without disrupting a user's sleep cycle;

a USB charging port integrated with the frame and connected to an internal power supply for charging electronic devices at bedside; and a waste disposal bin built into the frame for hygienic waste containment.

2. The utility cart of claim 1, wherein the multiple compartments of the upper drawer are segmented into varying sizes and configured for organizing medications, small medical devices, and personal care items at an ergonomic height accessible from a seated or semi-reclined position.

3. The utility cart of claim 1, wherein at least two of the plurality of caster wheels are lockable to secure the cart in place during use, preventing unintended movement.

4. The utility cart of claim 1, wherein the LED light is motion-activated to provide illumination upon detection of user movement.

5. The utility cart of claim 1, wherein the frame is constructed from aluminum, high-strength plastic, or a combination thereof.

6. The utility cart of claim 1, wherein the lid for the urinal inlet provides a seal to minimize odors.

7. The utility cart of claim 1, wherein the urine container has a leak-proof design and a volume capacity of at least 1 liter.

8. The utility cart of claim 1, wherein the tube is flexible, non-kinking, and made from medical-grade material resistant to urine and odors.

9. The utility cart of claim 1, wherein the upper drawer and the lower drawer each feature smooth-gliding runners for quiet operation, and the lower drawer includes a divider defining a compartment specifically sized to securely receive and contain the urine container.

10. The utility cart of claim 1, wherein the waste disposal bin includes a hinged lid configured to contain odors and accommodates standard small trash bags.

11. The utility cart of claim 1, wherein the caster wheels are swivel casters to enable 360-degree rotation for enhanced maneuverability.

12. The utility cart of claim 1, further comprising an integrated rechargeable battery configured to supply electrical power to the LED light and the USB charging port for cordless operation.

* * * * *